United States Patent Office 2,818,380
Patented Dec. 31, 1957

2,818,380

PROCESS FOR THE MANUFACTURE OF OXIMES

Harry Welz, Krefeld-Uerdingen, Germany, assignor to Farbenfabriken Bayer Aktiengesellschaft, Leverkusen, Germany, a corporation of Germany No Drawing. Application May 2, 1955
Serial No. 505,525

Claims priority, application Germany May 19, 1954

7 Claims. (Cl. 204—158)

The present invention relates to a process for the manufacture of aliphatic and cycloaliphatic oximes.

It is known to prepare aliphatic and cycloaliphatic oximes by the conversion of aldehydes and ketones with hydroxylamine or by the partial reduction of the corresponding nitro compounds. It is further known to obtain oximes by converting aliphatic and cycloaliphatic hydrocarbons with nitrosyl chloride. This process requires, however, long reaction times and low temperatures (about —25° C.). Moreover, very low yields are obtained.

The object of the present invention is to provide a technically very useful process of preparing in a single reaction from aliphatic and cycloaliphatic hydrocarbons directly the corresponding aldoximes or ketoximes.

The process according to the invention consists in that saturated hydrocarbons with at least 5 carbon atoms are converted with nitrosyl sulphuric acid in the presence of halides by irradiation with light. Electric lamps may serve, for example, as source of light.

The most advantageous temperature range for obtaining satisfactory yields lies below about 30° C., particularly between about 0° and about 20° C. Lower temperatures decrease the reaction speed, but may increase the yield in oximes referred to the converted hydrocarbons. At temperatures above 30° C., the amount of by-products rises steeply.

In some instance, the addition of catalysts such as aluminum chloride, zinc chloride, phosphorus trichloride or antimony trichloride, or of solvents such as concentrated sulphuric acid, hydrogen fluoride, nitrobenzene, chlorobenzene or carbon tetrachloride, accelerate the reaction.

Hydrocarbons which are suitable for the process are, for example, the pentanes, heptanes, octanes, nomanes, decanes, undecanes, the hydrocarbons of the Fischer-Tropsch-synthesis, cyclopentane, cyclohexane, cycloheptane, methyl cyclopentane, methyl cyclohexane, methyl cycloheptane, and decahydro naphthalene.

The conversion proceeds with equivalent amounts of hydrocarbon and nitrosyl sulphuric acid. In general, however, it is advantageous to use an excess of hydrocarbon, for example, at least 30–40%.

As halides there may be used, for example, hydrogen chloride, hydrogen bromide, the chlorides or bromides of metals such as sodium chloride, potassium chloride, magnesium chloride, calcium chloride, zinc chloride, cadmium chloride, aluminum chloride, ferric chloride, nickel chloride, cobalt chloride, chromium chloride, manganese chloride, sodium bromide or potassium bromide as well as non-metals such as thionyl chloride, phosphorus trichloride, arsenic trichloride, antimony trichloride or silicon tetrachloride.

In general, small amounts of these halides, for example, less than about 5%, are sufficient, but greater amounts do not hamper the reaction.

By the action of nitrosyl sulphuric acid upon the said hydrocarbons in the presence of halides there is formed according to the invention a solution of the corresponding oxime in the sulphuric acid liberated in the reaction. By separating the sulphuric acid layer from the unreacted hydrocarbon and neutralising the sulphuric acid with, for example, ammonia, the oxime can be obtained in a simple manner.

In those instances where the oxime is to be further treated in the Beckmann re-arrangement, the separation of the oxime from the sulphuric acid solution is not necessary. The re-arrangement can be carried out in the anhydrous sulphuric acid solution in known manner, for example, by heating or adding oleum or sulphur trioxide. The unreacted hydrocarbon can be re-cycled.

The process may be effected batchwise, for example, by intimately mixing the reaction compounds in an apparatus provided with agitator, preferably with cooling, until no further nitrosyl sulphuric acid is present in the sulphuric acid layer formed. In a large scale, the process can advantageously be carried out in a continuous manner, for example by directing the reaction mixture through several agitating tanks in series.

The following examples are given for the purpose of illustrating the invention.

Example 1

250 grams of n-hexane saturated with hydrogen chloride are treated in a glass vessel provided with a cooling jacket with stirring and irradiation with an electric lamp, with 65 grams of nitrosyl sulphuric acid. The temperature is maintained at about $+10°$ C. during the conversion. The conversion is complete after 2 hours. The nitrosyl sulphuric acid has disappeared. A solution of mixed hexane oximes in sulphuric acid has been formed, which rapidly settles as a layer on the bottom of the vessel when the agitator is stopped, and can easily be separated from the supernatant layer of unreacted hexane. The sulphuric acid solution is poured onto 60 grams of ice and neutralised with a 25% ammonia solution. A slightly yellow liquid, which is a mixture of hexane oximes, separates on the ammonium sulphate solution and is isolated. The yield is 34 grams. Another 1.6 grams of oximes dissolved in the ammonium sulphate solution are obtained by extracting with benzene and distilling off the benzene. The layer of hexane is distilled off whereby 215 grams of hexane come over and 5.5 grams of an oil boiling at a higher temperature than hexane remain.

Example 2

250 grams of cyclopentane are treated in a glass vessel provided with a cooling jacket with stirring and irradiation with an electric lamp, with a mixture of 130 grams of nitrosyl sulphuric acid and 4 grams of sodium chloride. The temperature is maintained during the conversion at about $+10°$ C. The nitrosyl sulphuric acid has disappeared after 3 hours and the reaction is complete. The sulphuric acid layer containing the cyclopentanone oxime is separated from the unreacted cyclopentane, poured onto 100 grams of ice and neutralised with a 25% ammonia solution. The cyclopentanone oxime precipitates and is filtered off and dried. The yield is 75 grams. Another 3.2 grams of oxime dissolved in the ammonium sulphate solution are obtained by extracting with benzene. 185 grams of pure cyclopentane are regained from the cyclopentane layer by distillation, while a residue of 11.4 grams of an oil remains having a higher boiling point than cyclopentane.

Example 3

A mixture of 250 grams of cyclohexane saturated with hydrogen chloride and 80 grams of nitrobenzene are treated as described in the above examples with 86 grams of nitrosyl sulphuric acid. The conversion is complete after 2½ hours. The oxime containing sulphuric acid is separated, poured onto 80 grams of ice and neutralised with a 25% ammonia solution. The cyclohexanone oxime precipitates thereby from the aqueous solution. It is filtered off and dried. The yield is 56 grams. Another 2.5 grams of oxime dissolved in the ammonium sulphate solution are obtained by extracting with benzene. 202 grams of unreacted cyclohexane and 80 grams of nitrobenzene can be covered by distilling the cyclohexane layer. 7 grams of an oil boiling at a temperature between the boiling points of cyclohexane and nitrobenzene are obtained as by-product.

*Example 4*

250 grams of cyclohexane saturated with hydrogen bromide are treated in a glass vessel provided with a cooling jacket with stirring and irradiation with an electric lamp while passing hydrogen bromide through it with 65 grams of nitrosyl sulphuric acid. The temperature is maintained at +5° C. by cooling with ice water. The conversion is complete after 2 hours. The sulphuric acid oxime layer is separated, poured onto 60 grams of ice and neutralised with a 25% ammonia solution. The cyclohexanone oxime is thereby precipitated out from the aqueous solution. It is filtered off and dried. The yield is 25 grams. 2 grams of oxime dissolved in the ammonium sulphate solution are obtained by extracting with benzene. The cyclohexane layer is decomposed by fractional distillation whereby 225 grams of cyclohexane are regained and 3 grams of an oil boiling above the boiling point of cyclohexane are obtained.

I claim:

1. A process for the manufacture of a sulfuric acid solution of an oxime from the corresponding hydrocarbon which comprises reacting a saturated hydrocarbon selected from the group consisting of aliphatic and cycloaliphatic hydrocarbons containing at least five carbon atoms with nitrosyl sulfuric acid in admixture with a halide selected from the group consisting of halides of hydrogen, alkali metals, alkaline earth metals, zinc, cadmium, aluminum, iron, nickle, cobalt, chromium, manganese, thionyl, phosphorus, arsenic, antimony, and silicon while irradiating with light at a temperature up to 30° C., the amount of halide being sufficient to slowly produce an amount of nitrohalide in sulfuric acid solution sufficient to produce the oxime in sulfuric acid solution.

2. A process according to claim 1 in which an excess of hydrocarbon is used.

3. A process according to claim 1 carried out in the presence of a catalyst.

4. A process according to claim 1 carried out in the presence of a solvent.

5. A process according to claim 1 in which the halide is a halide of a metal.

6. A process according to claim 1 in which the halide is a halide of a non-metal.

7. A process according to claim 3 in which the catalyst is a material selected from the group consisting of aluminium chloride, zinc chloride, phosphorus trichloride and antimony trichloride.

References Cited in the file of this patent

UNITED STATES PATENTS 2,719,116 Brown _____ Sept. 27, 1955

FOREIGN PATENTS 992,772 France _____ July 11, 1951